United States Patent [19]

Brinati et al.

[11] Patent Number: 5,583,190
[45] Date of Patent: Dec. 10, 1996

[54] POLYVINYLIDENEFLUORIDE HAVING HIGH MECHANICAL PROPERTIES AND HIGH THERMOCHEMICAL STABILITY AND THE PREPARATION PROCESS THEREOF

[75] Inventors: Giulio Brinati, Milan; Vincenzo Arcella, Novara; Margherita Albano, Milan, all of Italy

[73] Assignee: Ausimont S.p.A., Italy

[21] Appl. No.: 534,671

[22] Filed: Sep. 27, 1995

Related U.S. Application Data

[63] Continuation of Ser. No. 248,917, May 25, 1994, abandoned.

[30] Foreign Application Priority Data

May 28, 1993 [IT] Italy .................. MI93A1112

[51] Int. Cl.[6] ........................................... C08F 4/32
[52] U.S. Cl. .................. 526/230.5; 526/232.1; 526/227; 526/255
[58] Field of Search .................. 526/255, 230.5, 526/232.1, 227, 255

[56] References Cited

U.S. PATENT DOCUMENTS

| | | |
|---|---|---|
| 3,193,539 | 7/1965 | Hauptschein . |
| 3,475,396 | 10/1969 | McCain et al. . |
| 3,780,007 | 12/1973 | Stallings . |
| 4,025,709 | 5/1977 | Blaise et al. . |
| 4,360,652 | 11/1982 | Dohany . |
| 4,789,717 | 12/1988 | Giannetti et al. . |
| 4,864,006 | 9/1989 | Gianntti et al. . |
| 5,093,427 | 3/1992 | Barber ................. 526/255 |
| 5,095,081 | 3/1992 | Bacque et al. ............ 526/255 |

FOREIGN PATENT DOCUMENTS

| | | | |
|---|---|---|---|
| 451833 | 10/1948 | Canada .................. 526/255 |
| 2073490 | 10/1971 | France . | |
| 5834814 | 3/1983 | Japan .................. 526/255 |
| 5834484 | 7/1983 | Japan .................. 526/255 |
| 590817 | 7/1947 | United Kingdom .......... 526/255 |
| 761327 | 11/1956 | United Kingdom .......... 526/255 |
| 1179078 | 1/1970 | United Kingdom . | |
| 1242362 | 8/1971 | United Kingdom .......... 526/255 |

OTHER PUBLICATIONS

Official Gazette 1046 TMDG 2—Sep. 4, 1984.
4404, Chemical Abstracts macromolecular sections vol. 74, (1971), nr 22,31 mol.
European Search Report on European Patent Application No. EP 94107588.

Primary Examiner—Joseph L. Schofer
Assistant Examiner—N. Sarafim
Attorney, Agent, or Firm—Spencer & Frank

[57] ABSTRACT

A polyvinylidenefluoride (PVDF) having high mechanical properties both at room temperature and at high temperatures, having very good processability and high thermochemical resistance to dehydrofluorination, is prepared by means of a polymerization process of vinylidenefluoride in aqueous emulsion at a temperature comprised between 95° and 120° C., in the presence of a chain transfer agent. In this way it is possible to obtain, using non-hazardous peroxidic initiators (for instance diterbutylperoxide), a PVDF particularly suitable for applications where high mechanical and thermochemical resistance properties are required, such as for instance the manufacture of articles for chemical industry (pipes, valves, fittings, tanks, heat exchangers, membranes, flanges, etc.).

8 Claims, No Drawings

POLYVINYLIDENEFLUORIDE HAVING HIGH MECHANICAL PROPERTIES AND HIGH THERMOCHEMICAL STABILITY AND THE PREPARATION PROCESS THEREOF

This is a continuation of application Ser. No. 08/248,917, filed on May 25, 1994, now abandoned.

FIELD OF THE INVENTION

The present invention relates to a polyvinylidenefluoride (PVDF) having high mechanical properties and high thermochemical stability, and to the preparation process thereof.

BACKGROUND OF THE INVENTION

It is known that vinylidene fluoride (VDF) can be polymerized in aqueous emulsion using inorganic or organic peroxides as initiators. Among the latter, diterbutylperoxide (DTBP), as described in U.S. Pat. No. 3,193,539, has resulted particularly effective. With such initiator the polymerization is carried out at high temperatures, generally comprised between 120° and 130° C., and at a pressure comprised between 300 and 1000 psig, without employing any chain transfer agent. The PVDF obtained with such process shows a low cristallinity degree, with a high amount of structural defects (tail-to-tail and head-to-head inversions, branchings, microgels), and consequently unsatisfactory mechanical properties and mouldability, quite unsuitable for the manufacture of articles, such as pipes, valves, fittings, tanks, heat exchangers, membranes, flanges, etc, to be employed in the chemical industry.

In U.S. Pat. No. 3,475,396 a VDF polymerization process is described, wherein diisopropyl peroxydicarbonate (IPP) is used as initiator, optionally in the presence of a suitable chain transfer agent. IPP is characterized by a half-life of 1 hour at 61° C., therefore the process can be carried out at lower temperatures in comparison to DTBP, generally comprised between 65° and 85° C., with reaction times lower than 6 hours. The low polymerization temperature allows to obtain a PVDF having high mechanical properties, since the structural defects are drastically reduced and therefore the crystallinity of the product is higher.

The PVDF obtained with the low temperature process mentioned above, though having high crystallinity degree and very good mechanical characteristics, shows poor thermochemical resistance to dehydrofluorination. In fact, on the basis of the experimentation carried out by the Applicant, it has been found that the PVDF obtained at low temperature, if submitted to high temperatures (over 100° C.) or contacted with basic solutions (for instance NaOH at 10%), tends to dehydrofluorinating, with formation in the chain of conjugated double bonds of the —CF═CH—CF═CH— type. The formation of such structural defects, besides conferring undesired colorations, lowers considerably the mechanical resistance of the material, as shown by measurements of chemical stress cracking.

Moreover, the low temperature process shows several drawbacks especially connected to the use of extremely hazardous peroxidic initiators, such as IPP, since explosive also at low temperatures. For instance, IPP has a self-accelerating decomposition temperature (SADT) of about 10° C. and requires a shipment temperature lower than −10° C. This requires to take particular safety measures both for transportation and storage, and during its use in the polymerization process. Because of the hazard with such products, in some countries their use on an industrial scale was submitted to severe restrictions.

DESCRIPTION OF THE INVENTION

The Applicant has now surprisingly found that it is possible to obtain a PVDF having high mechanical properties both at room temperature and at high temperatures, having very good processability and high thermochemical resistance to dehydrofluorination, by means of a VDF polymerization process in aqueous emulsion at high temperatures, comprised between 95° and 120° C., in the presence of a chain transfer agent. It is thus possible to obtain, using non-hazardous peroxidic initiators (for instance DTBP), a PVDF particularly suitable to applications where high mechanical properties and thermochemical resistance are required, such as for instance the manufacture of articles for chemical industry (pipes, valves, fittings, tanks, heat exchangers, membranes, flanges, etc.).

It is therefore object of the present invention a polyvinylidenefluoride having a head-to-head and tail-to-tail inversion content comprised between 5 and 5.5% by moles, a yield stress higher than 50 MPa and an elastic modulus higher than 1500 MPa (measured at 23° C. according to ASTM Method D-1708), a Melt Flow Index (MFI, measured at 230° C. with a 5 kg load according to ASTM Method D-1238) comprised between 1 and 25 g/10', preferably between 3 and 20 g/10'.

It results particularly surprising the fact that, notwithstanding the relatively high inversion content, the mechanical properties of the PVDF object of the present invention, such as the yield stress and the elastic modulus, are high indeed, with values substantially equal to those of the PVDF obtained with a low temperature process. With respect to the latter, the Applicant has found that the presence of a higher inversion content increases the stability to dehydrofluorination. A possible interpretation of this phenomenon, which has a merely speculative character and does not limit the scope of the present invention in any way, is that the presence in the chain of head-to-head —$CF_2$—$CF_2$— and tail-to-tail —$CH_2CH_2$— defects introduces a discontinuity in the sequence of —$CF_2$— and —$CH_2$— groups, thus hindering the dehydrofluorination.

The PVDF object of the present invention shows moreover an improved processability if compared to a PVDF obtained at low temperature. The latter, indeed, because of the high molecular rigidity, is characterized, the Melt Flow Index being the same, by higher viscosity values at high rate gradients.

Therefore, with respect to the PVDF obtained at low temperatures, the PVDF object of the present invention combines, the mechanical properties being the same, a high thermal stability to dehydrofluorination with an improved processability.

A further advantage of the PVDF object of the present invention consists in a low microgel content, generally lower than 5% by weight, a value remarkably lower if compared with the product obtained according to the high temperature processes of the prior art, and substantially equivalent to those obtainable with the low temperature processes. Such a low microgel content ensures very good mechanical properties and high processability.

The PVDF object of the present invention, besides the above mentioned applications in the chemical industry, can be employed in electric and electronic industry for cable coating, or in special applications, such as for instance the production of high resistance fishing threads and strings for musical instruments.

A further object of the present invention consists in a process for preparing the above described polyvinylidenefluoride, which comprises polymerizing vinylidene fluoride in aqueous emulsion in the presence of an organic peroxide and of a chain transfer agent, at a temperature comprised between 95° and 120° C., preferably between 100° and 115° C.

The polymerization pressure can generally vary between 30 and 100 bar, preferably between 40 and 90 bar.

As initiator, any organic peroxide active at the above indicated polymerization temperature can be employed. For example, it can be selected for instance from dialkylperoxides, dialkylperoxycarbonates, dibenzoylperoxide, t-alkylperoxybenzoates, t-alkylperoxypivalates. Among them, the peroxides having a self-accelerating decomposition temperature (SADT) higher than 50° C. are particularly preferred, such as for instance: diterbutylperoxide, diterbutylperoxyisopropylcarbonate, terbutyl(2-ethyl-hexyl)peroxycarbonate, terbutylperoxy-3,5,5-trimethylhexanoate. The initiator quantity is generally comprised between 0.1 and 10 $g/l_{H2O}$, preferably between 0.5 and 5 $g/l_{H2O}$.

The chain transfer agent is selected from those known in the polymerization of fluorinated monomers, such as for instance: ketones, esters, ethers or aliphatic alcohols having from 3 to 10 carbon atoms, such as acetone, ethylacetate, diethylether, isopropyl alcohol, etc.; chloro(fluoro)carbons, optionally containing hydrogen, having from 1 to 6 carbon atoms, such as chloroform, trichlorofluoromethane; bis-(alkyl)carbonates wherein the alkyl has from 1 to 5 carbon atoms, such as bis(ethyl)carbonate, bis(isobutyl)carbonate; etc.

The chain transfer agent is fed into the reactor either continuously or in discrete amounts during the polymerization. It is not advisable feeding all the chain transfer agent at the beginning of the polymerization, since we have noticed that such a feeding method, besides strongly inhibiting the reaction kinetics, causes a worsening of the mechanical and processing properties of the polymer.

Moreover it has been found that a remarkable improvement in the mechanical properties of the final product is obtainable by feeding the chain transfer agent according to the following method. Fixing a total amount of PVDF to be produced, expressed as concentration of the polymer in water (measured as $g/l_{H2O}$), equal to $Q_{TOT}$, and a total amount of chain transfer agent to be fed equal to $F_{TOT}$, the chain transfer agent is preferably fed in such a way that, by subdividing $F_{TOT}$ into 10 portions $F_i$ (i=0÷9), each portion is fed into the reaction system at the concentrations $Q_i$ according to the following law: when $Q_0=0$, $F_0=0÷0.15 \cdot F_{TOT}$; when $Q_1=0.1 \cdot Q_{TOT}$, $F_1=0.2÷0.3 \cdot F_{TOT}$; when $Q_2=0.2 \cdot Q_{TOT}$, $F_2=0.1+0.15 \cdot F_{TOT}$; when $Q_3 0.3 \cdot Q_{TOT}$, $F_3=0.05÷0.15 \cdot F_{TOT}$; when $Q_4=0.4 \cdot Q_{TOT}$, $F_4=0.05÷0.15 \cdot F_{TOT}$; when $Q_5=0.5 \cdot Q_{TOT}$, $F_5=0.05÷0.10 \cdot F_{TOT}$; when $Q_6=0.6 \cdot Q_{TOT}$, $F_6=0.05÷0.10 \cdot F_{TOT}$; when $Q_7=0.7 \cdot Q_{TOT}$, $F_7=0÷0.08 \cdot F_{TOT}$; when $Q_8=0.8 \cdot Q_{TOT}$, $F_8=0÷0.08 \cdot F_{TOT}$; when $Q_9=0.9 \cdot Q_{TOT}$, $F_9=0÷0.08 \cdot F_{TOT}$; the sum of the quantities $F_i$ being equal to $F_{TOT}$.

The total amount of chain transfer agent added during the polymerization ($F_{TOT}$) depends both on the effectiveness of the chain transfer agent itself, and on the molecular weight intended for the final product. In any event, such amount must be such that to obtain MFI values within the above indicated range, and it is generally comprised between 0.05 and 5%, preferably between 0.1 and 2.5% by weight with respect to the total monomer quantity fed into the reactor.

A suitable surfactant is added to the reaction medium to stabilize the aqueous emulsion (see for instance those described in U.S. Pat. Nos. 4,360,652 and 4,025,709). Generally, they are fluorinated surfactants, selected from products of the general formula:

$$R_f-X^-M^+$$

where $R_f$ is a (per) fluoroalkyl chain $C_5$–$C_{16}$ or a (per) fluoropolyoxyalkylene chain, $X^-$ is —$COO^-$ —$SO_3^-$, $M^+$ is selected from: $H^+$, $NH_4^+$, alkali metal ion. Among the most commonly employed we cite: ammonium perfluoro-octanoate; (per) fluoropolyoxyalkylenes end-capped with one or more carboxyl groups; salts of sulphonic acids of formula $R_f$—$C_2H_4SO_3H$, where $R_f$ is a $C_4$–$C_{10}$ perfluoroalkyl (see U.S. Pat. No. 4,025,709); etc.

The process object of the present invention can be carried out in the presence of an emulsion or, preferably, of a microemulsion of perfluoropolyoxyalkylenes, according to what described in U.S. Pat. No. 4,789,717 and U.S. Pat. No. 4,864,006, which are herein incorporated by reference, or also in presence of a microemulsion of fluoropolyoxyalkylenes having hydrogenated end groups and/or hydrogenated repetitive units, according to what described in Italian patent application MI93A/001007, filed on May 18, 1993 in the name of the Applicant.

A mineral oil or a paraffin, liquid at the polymerization temperature, can be added to the reaction mixture, in order to inhibit the polymer coagulation and avoiding its adhesion to the reactor walls.

EXAMPLES

Some working examples of the invention are reported hereinunder, whose aim is merely illustrative but not limitative of the scope of the invention itself.

Example 1

In a 10 l vertical reactor, equipped with a stirrer working at 480 rpm, 6.5 l of H$_2$O and 35 g of paraffin wax (product AGIP® 122–126 having a melt temperature of 50°–52° C.) were charged. The reactor was then heated to the working temperature of 115° C. and brought to the pressure of 44 relative bars by feeding VDF. The VDF is continuously fed during the polymerization so as to keep the pressure constant. 500 ml of a 1.820% by weight aqueous solution of perfluorooctanoic acid potassium salt and 23.7 g of diterbutylperoxide (DTBP) were then added. During the polymerization, 0.082 mols of chloroform as chain transfer agent, subdivided into 10 portions, were fed into the reactor.

Fixing a total amount of 1000 g of polymer to be produced, corresponding to a final polymer concentration in water equal to 143.0 $g/l_{H2O}$, chloroform was fed in 10 portions at regular intervals of 10% of increase in the polymer concentration with respect to the final concentration, according to the following scheme:

| Polymer concentration ($g/l_{H2O}$) | Added amount of chain transfer agent (mols) |
|---|---|
| 0 | 0.005 (6.1%) |
| 14.3 | 0.018 (22.0%) |
| 28.6 | 0.010 (12.2%) |
| 42.9 | 0.009 (11.0%) |

-continued

| Polymer concentration ($g/l_{H2O}$) | Added amount of chain transfer agent (mols) |
|---|---|
| 57.2 | 0.008 (9.8%) |
| 71.5 | 0.007 (8.5%) |
| 85.8 | 0.007 (8.5%) |
| 100.1 | 0.006 (7.3%) |
| 114.4 | 0.006 (7.3%) |
| 128.7 | 0.006 (7.3%) |
| 143.0 | — |

The polymer concentration in the reaction medium was monitored by measuring the amount of gaseous monomer fed into the reactor after the initial loading phase.

After 290 minutes the desired polymer concentration (143.0 $g/l_{H2O}$) was reached, hence the VDF feeding was stopped and the latex discharged from the reactor (solid concentration equal to 12.5% by weight). The polymer was coagulated, washed with demineralized water and dried at 75° C. for 24 hours. The so obtained product was then reduced in the form of pellets by extrusion and characterized. The data are reported in Table 1. The MFI was measured at 230° C. with a 5 kg load according to ASTM D-1238 Method, the mechanical properties were determined at 23° and 125° C. according to ASTM D-1708 Method. By means of differential scanning calorimetry (DSC) the second melting enthalpy ($\Delta H_f'$), the second melting temperature ($T_f'$) and the second recrystallization enthalpy ($\Delta H_{xx}$) were determined. The inversion percentage was determined, according to known techniques, by $^{19}F$-NMR analysis. A PVDF sample was dissolved in dimethylacetamide at 50° C. and on the so obtained solution the weight percentage of microgels was determined by means of ultracentrifugation (at 20,000 rpm for 90 minutes at room temperature).

Example 2

Preparation of a Perfluoropolyoxyalkylene Microemulsion

In a glass vessel equipped with a stirrer, 7.8 ml of the compound of formula:

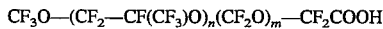

$$CF_3O—(CF_2—CF(CF_3)O)_n(CF_2O)_m—CF_2COOH$$

having n/m=10 and an average molecular weight of 600, were mixed under mild stirring with 7.8 ml of NH$_4$OH at 30% by volume. 15.6 ml of demineralized water were then added. To the so obtained solution 4.7 ml of Galden® DO2 of formula:

$$CF_3O—(CF_2—CF(CF_3)O)_n(CF_2O)_m—CF_3$$

having n/m=20 and an average molecular weight of 450, were added. By heating to 85° C. the microemulsion was obtained, which appears as a thermodynamically stable, limpid solution.

Polymerization Reaction

Example 1 was repeated in the same conditions, except that in this case, before starting adding DTBP, the whole microemulsion previously prepared and heated to 85° C. was fed into the autoclave.

After 180 minutes of reaction, the desired concentration of 143.0 $g/l_{H2O}$ was reached, hence the VDF flow was stopped and the latex discharged, from which the polymer was separated and characterized as described in Example 1. The data are reported in Table 1.

Example 3

Example 1 was repeated in the same conditions, varying only the chain transfer agent feeding law, according to the following scheme:

| Polymer concentration ($g/l_{H2O}$) | Added amount of chain transfer agent (mols) |
|---|---|
| 0 | 0.005 (6.1%) |
| 14.3 | 0.009 (11.0%) |
| 28.6 | 0.008 (9.8%) |
| 42.9 | 0.009 (11.0%) |
| 57.2 | 0.008 (9.8%) |
| 71.5 | 0.009 (11.0%) |
| 85.8 | 0.008 (9.8%) |
| 100.1 | 0.009 (11.0%) |
| 114.4 | 0.008 (9.8%) |
| 128.7 | 0.009 (11.0%) |
| 143.0 | — |

After 270 minutes the desired polymer concentration (143.0 $g/l_{H2O}$) was reached. The polymer was separated and characterized as described in Example 1. The data are reported in Table 1.

Example 4

Example 1 was repeated in the same conditions, except that the amount of chloroform used as chain transfer agent is equal to 0.05 total moles, fed according to the following scheme:

| Polymer concentration ($g/l_{H2O}$) | Added amount of chain transfer agent (mols) |
|---|---|
| 0 | 0.005 (10.0%) |
| 14.3 | 0.005 (10.0%) |
| 28.6 | 0.005 (10.0%) |
| 42.9 | 0.005 (10.0%) |
| 57.2 | 0.005 (10.0%) |
| 71.5 | 0.005 (10.0%) |
| 85.8 | 0.005 (10.0%) |
| 100.1 | 0.005 (10.0%) |
| 114.4 | 0.005 (10.0%) |
| 128.7 | 0.005 (10.0%) |
| 143.0 | — |

After 227 minutes the desired polymer concentration (143.0 $g/l_{H2O}$) was reached. The polymer was separated and characterized as described in Example 1. The data are reported in Table 1.

Example 5 (Comparative)

Example 1 was repeated in the same conditions, except that the polymerization temperature was fixed to 125° C. and no chain transfer agent was used.

After 90 minutes of reaction, the polymer was separated and characterized as described in Example 1. The data are reported in Table 1.

Example 6 (Comparative)

Example 1 was repeated in the same conditions, except that the polymerization temperature was fixed to 125° C. and 0.025 total moles of chloroform were employed as chain transfer agent, fed according to the following scheme:

| Polymer concentration (g/l$_{H2O}$) | Added amount of chain transfer agent (mols) |
|---|---|
| 0 | 0.0025 (10.0%) |
| 14.3 | 0.0025 (10.0%) |
| 28.6 | 0.0025 (10.0%) |
| 42.9 | 0.0025 (10.0%) |
| 57.2 | 0.0025 (10.0%) |
| 71.5 | 0.0025 (10.0%) |
| 85.8 | 0.0025 (10.0%) |
| 100.1 | 0.0025 (10.0%) |
| 114.4 | 0.0025 (10.0%) |
| 128.7 | 0.0025 (10.0%) |
| 143.0 | — |

After 120 minutes the desired polymer concentration (143.0 g/l$_{H2O}$) was reached. The polymer was separated and characterized as described in Example 1. The data are reported in Table 1.

Example 7 (Comparative)

Following the operative modalities described in Example 1, VDF was polymerized at 75° C. using as initiator 1.4 g of isopropylperoxydicarbonate (IPP), fed into the autoclave in the form of aqueous emulsion containing 2% by weight of IPP and 0.2% by weight of perfluorooctanoic acid potassium salt. 500 ml of a 1.820% by weight aqueous solution of perfluorooctanoic acid potassium salt were added to the reaction mixture. As chain transfer agent $CFCl_3$ was employed, in a total amount of 2.5 g, fed in a single portion at the beginning of the polymerization.

After 120 minutes the desired polymer concentration (143.0 g/l$_{H2O}$) was reached. The polymer was separated and characterized as described in Example 1. The data are reported in Table 1.

expressed as mg of $F^-$ per Kg of polymer. Since the $F^-$ ions derive from the decomposition of the polymer by dehydrofluorination, the lower the quantity of $F^-$ ions produced, the higher the polymer stability to dehydrofluorination. The obtained results are reported in Table 2, from which it can be derived that the PVDF according to the present invention (Ex. 1) has a stability to dehydrofluorination significantly higher than that of the PVDF obtained according to the low temperature process (Ex.7), and substantially equivalent to that of the PVDf obtained according to the high temperature process (Ex.5).

TABLE 2

| TESTED PRODUCT | POLYM. TEMP. (°C.) | PRODUCED $F^-$ IONS (mg/Kg of polymer) | | |
|---|---|---|---|---|
| | | after 16 hrs | after 38 hrs | after 62 hrs |
| EX. 1 | 115 | 3 | 4 | 6 |
| EX. 5 | 125 | 2 | 3 | 5 |
| EX. 7(*) | 75 | 3 | 5 | 11 |

(*)comparative

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

We claim:

1. Process for preparing a polyvinylidenefluoride homopolymer having a head-to-head and tail-to-tail inversion content between 5 and 5.5% by mols, a yield point greater than 50 MPa and an elastic modulus greater than 1500 MPa (measured at 23° C. according to ASTM D-1708

TABLE 1

| PROPERTIES | EX. 1 | EX. 2 | EX. 3 | EX. 4 | EX. 5(*) | EX. 6(*) | EX. 7(*) |
|---|---|---|---|---|---|---|---|
| MFI (g/10') | 18.0 | 7.0 | 16.0 | 3.0 | 0.1 | 19 | 13 |
| MICROGELS (% weight) | <5 | <5 | <5 | <5 | 40 | <5 | <5 |
| $\Delta H_f'$ (cal/g) | 14.2 | 13.8 | 13.9 | 13.5 | 12.1 | 12.8 | 14.8 |
| $T_f'$ (°C.) | 165 | 165 | 164 | 164 | 159 | 161 | 168 |
| $|\Delta H_{xx}|$ (cal/g) | 13.7 | 13.5 | 13.5 | 13.1 | 11.9 | 12.1 | 13.7 |
| INVERSIONS (moles %) | 5.3 | 5.3 | 5.3 | 5.3 | 5.3 | 5.4 | 4.6 |
| TENSILE STRESS RESISTANCE (23° C.) | | | | | | | |
| Elastic modulus (MPa) | 1765 | 1690 | 1700 | 1550 | 1200 | 1450 | 1700 |
| Yield point (MPa) | 54 | 53 | 53 | 51 | 44 | 46 | 53 |
| Stress at break (MPa) | 31 | 35 | 18 | 30 | 31 | 30 | 32 |
| Elongation at break (%) | 40 | 50 | 35 | 50 | 180 | 25 | 50 |
| TENSILE STRESS RESISTANCE (125° C.) | | | | | | | |
| Plastic Modulus (MPa) | 320 | 314 | 310 | 300 | 195 | 220 | 340 |
| Yield Point (MPa) | 12 | 11 | 11 | 11 | 8 | 9 | 13 |
| stress at break (MPa) | 30 | 35 | 28 | 33 | 30 | 30 | 37 |
| Elongation at break (%) | 720 | 760 | 710 | 760 | 800 | 600 | 700 |

(*) comparative examples

Samples of the PVDF obtained in Examples 1, 5, and 7 were subjected to chemical resistance tests according to the following method.

The PVDF was subjected to compression moulding to obtain plates of 3.5 g. The specimens were immersed in a NaOH solution (40% weight/volume) at 100° C. for different times (16, 38, and 62 hours). After removing the polymer, the quantity of $F^-$ ions present in the aqueous basic solution was determined by ionic chromatography, and Method), a Melt Flow Index (MFI, measured at 230° C. with a 5 kg load according to ASTM D-1238 Method) between 1 and 25 g/10', and thermal stability to dehydrofluorination consisting essentially of polymerizing vinylidene fluoride in aqueous emulsion in the presence of a non-hazardous organic peroxide selected from dialkylperoxides, dialkylperoxycarbonates, dibenzoylperoxide, t-alkylperoxybenzoates, and t-alkylperoxypivalates, having a self-accelerating decomposition temperature (SADT) greater than 50° C.

and of a chain transfer agent, at a temperature between 95° and 120° C. wherein said chain transfer agent is fed into the reactor continuously or in discrete amounts during the polymerization.

2. Process according to claim 1, wherein the polymerization temperature is between 100° and 115° C.

3. Process according to claim 1, wherein the polymerization pressure is between 30 and 100 bar.

4. Process according to claim 3, wherein the polymerization pressure is between 40 and 90 bar.

5. Process according to claim 1, wherein the organic peroxide is selected from: diterbutylperoxide, diterbutylperoxyisopropylcarbonate, terbutyl(2-ethylhexyl)peroxycarbonate, and terbutylperoxy-3,5,5-trimethylhexanoate.

6. Process according to claim 1, wherein the chain transfer agent is selected from: ketones, esters, ethers or aliphatic alcohols having from 3 to 10 carbon atoms; chloro(fluoro)carbons, optionally containing hydrogen, having from 1 to 6 carbon atoms; and bis(alkyl)carbonates wherein the alkyl has from 1 to 5 carbon atoms.

7. Process according to claim 1, wherein, fixing a total amount of PVDF to be produced, expressed as concentration of the polymer in water, equal to $Q_{TOT}$, and a total amount of chain transfer agent to be fed equal to $F_{TOT}$, the chain transfer agent is fed so as, subdividing $F_{TOT}$ into 10 portions $F_1$ (i=0÷9), each portion is fed into the reaction system at the concentrations $Q_1$, according to the following: when $Q_0=0$, $F_0=0\div0.15\cdot F_{TOT}$; when $Q_1=0.1\cdot Q_{TOT}$, $F_1=0.2\div0.3\cdot F_{TOT}$; when $Q_2=0.2\cdot Q_{TOT}$, $F_2=0.1\div0.15\cdot F_{TOT}$; when $Q_3=0.3\cdot Q_{TOT}$, $F_3=0.05\div0.15\cdot F_{TOT}$; when $Q_4=0.4\cdot Q_{TOT}$, $F_4=0.05\div0.15\cdot F_{TOT}$; when $Q_5=0.5\cdot Q_{TOT}$, $F_5=0.05\div0.10\cdot F_{TOT}$; when $Q_6=0.6\cdot Q_{TOT}$, $F_6=0.05\div0.10\cdot F_{TOT}$; when $Q_7=0.7\cdot Q_{TOT}$, $F_7=0\div0.08\cdot F_{TOT}$; when $Q_8=0.8\cdot Q_{TOT}$, $F_8=0\div0.08\cdot F_{TOT}$; when $Q_9=0.9\cdot Q_{TOT}$, $F_9=0\div0.08\cdot F_{TOT}$; the sum of the quantities $F_i$ being equal to $F_{TOT}$.

8. Process for preparing a polyvinylidene fluoride homopolymer consisting essentially of:

polymerizing vinylidene fluoride in an aqueous emulsion in the presence of a non-hazardous organic peroxide selected from dialkylperoxides, dialkylperoxycarbonates, dibenzoyl peroxide, t-alkylperoxybenzoates and t-alkylperoxyprivalates wherein said peroxides have a self-accelerating decomposition temperature (SADT) greater than 50° C.; a chain transfer agent at a temperature between 95° C. and 120° C.;

feeding said chain transfer agent into the reactor continuously or in discrete amounts during polymerization; and recovering a polyvinylidene fluoride homopolymer having a head-to-head and tail-to-tail inversion content between 5 and 5.5 % by mols, a yield point greater than 50 MPa and an elastic modulus greater than 1500 MPa (measured at 23° C. according to ASTM-D-1708 method), a Melt Flow Index (MFI measured at 230° C with a 5 kg load according to ASTM-D-1238 Method) between 1 and 25 g/10' and thermochemical stability to dehydrofluorination.

\* \* \* \* \*